April 21, 1959
R. C. FISCHER
2,883,196
ECCENTRIC CONICAL FEED MEMBERS FOR MANURE SPREADER
Filed March 16, 1955
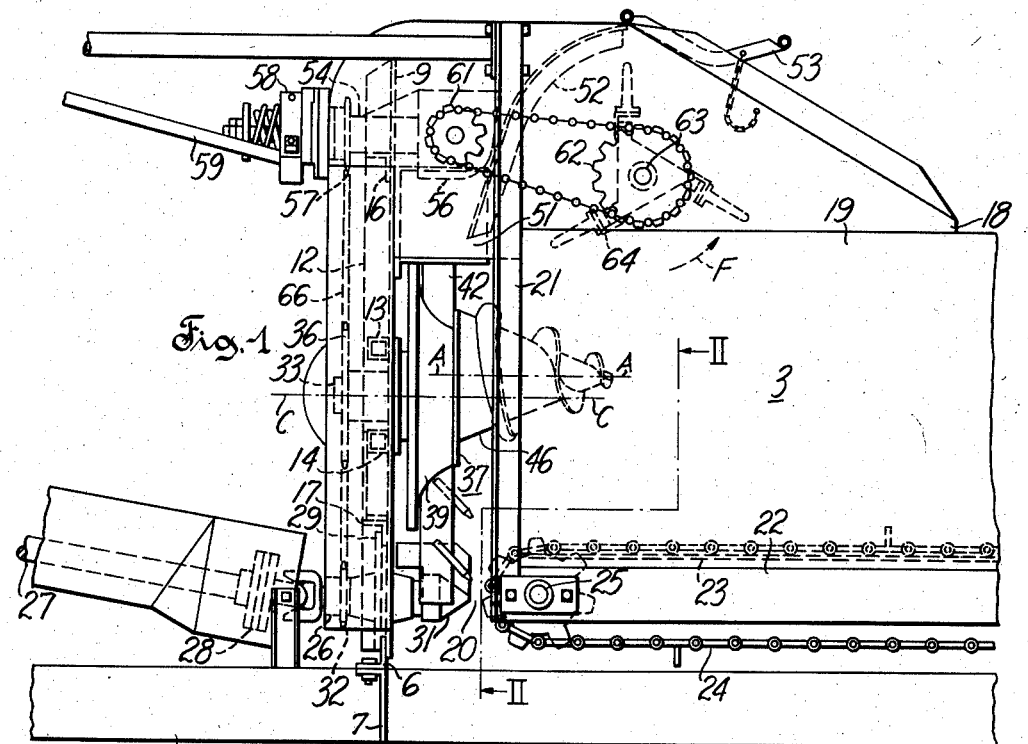
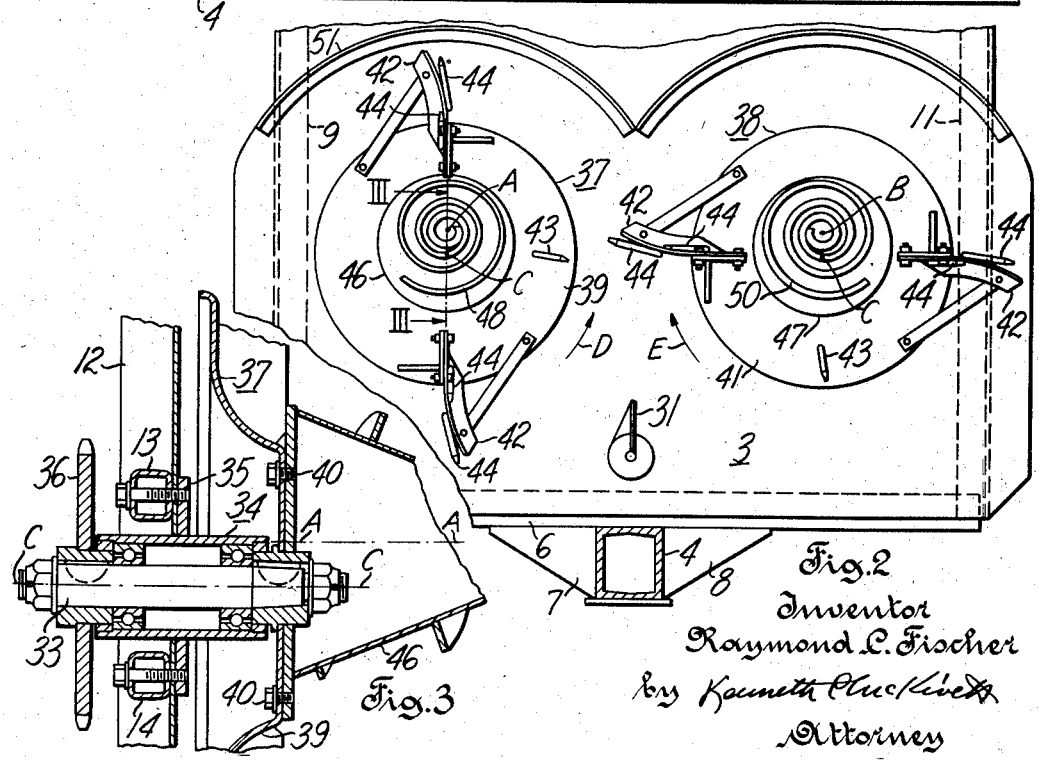
Fig.2
Inventor
Raymond C. Fischer
by Kenneth Chuckleoth
Attorney

United States Patent Office 2,883,196
Patented Apr. 21, 1959

2,883,196

ECCENTRIC CONICAL FEED MEMBERS FOR MANURE SPREADER

Raymond C. Fischer, Oak Park, Mich., assignor to Allis-Chalmers Manufacturing Company, Milwaukee, Wis.

Application March 16, 1955, Serial No. 494,643

4 Claims. (Cl. 275—6)

This invention relates to machines for spreading manure on farm land, and while the invention is applicable to various types of such machines it is shown and described herein as applied to a front delivery type of manure spreader such as shown, for instance, in the patent to Scranton U.S. 2,660,439, dated November 24, 1953, and in the patent to Fergason U.S. 2,626,809, dated January 27, 1953.

More particularly, the present invention is concerned with and directed toward the provision of a material handling mechanism incorporating features designed to improve the functional coaction of parts in a manner affording material advantages as to feeding manure in the form of stable or barnyard refuse to a slinging device, and as to reducing the amount of power required to perform this feeding operation.

It is therefore, a principal object of this invention to provide an improved manure spreader having a receptacle, a slinging device and means for agitatingly and aggressively feeding manure from the receptacle to the slinging device.

Another object of this invention is to provide an efficient feeding device operative to bridge the gap between the discharge end of a floor conveyer and slinger members.

A further object of this invention is to provide a feeder device which eliminates plugging and whose power requirements are low.

The construction and operation of apparatus embodying the invention will become readily apparent as the disclosure progresses and particularly points out additional features and advantages considered of special importance. And accordingly, the invention may be considered as consisting of various details of construction, correlation of elements and arrangement of parts as is more fully set forth in the following description, reference being had to the accompanying drawings in which:

Fig. 1 is a side elevation of the forward part of a manure spreader embodying the invention;

Fig. 2 is a section view taken on line II—II of Fig. 1; and

Fig. 3 is an enlarged section view of a portion of the mechanism shown in Figs. 1 and 2, the view of Fig. 3 being taken on line III—III of Fig. 2.

Referring to Fig. 1 of the drawings, it is seen that the invention may be embodied in a power take-off operated, front delivery type manure spreader 3 having a central tubular frame member 4 which is adapted to be mounted on a two wheeled axle structure (not shown) and which may be hitched at its forward end in a conventional manner to a tractor (not shown). A transversely extending angle member 6 is attached to gusset plates 7 and 8 (Fig. 2) which are joined to an intermediate portion of the tubular frame member 4 as by welding. Vertically extending angle members 9 and 11 are attached to opposite ends of angle member 6 and these vertical members are additionally braced and spaced apart by a vertically extending plate or front end member 12, by transversely extending tube members 13 and 14 (Fig. 1) and by transversely extending angle irons 16 and 17. Longitudinally extending transversely spaced plates 18 are attached at their forward ends to angle members 9 and 11, respectively (only the plate attached to angle member 9 being shown). Longitudinally extending transversely spaced side members 19 (only one of which is shown) are attached at their forward upper ends to plates 18 and are further joined thereto by means of vertically extending angle irons 21 which are attached to the side members and plates by conventional means. Extending along the lower portions of side members 19 are longitudinally extending frame members 22 (only one of which is shown) which carry manure supporting floor section 23 about which an endless material conveyer 24 is operatively mounted. The forward ends of frame members 22 rotatably receive end portions of a transversely extending shaft 25 which drivingly supports the forward end of conveyer 24. The rear end of the conveyer is supported in a generally similar manner (not shown). Material supporting floor section 23, front end plate 12, longitudinally extending side members 19, and a rear end plate (not shown) mounted transversely between members 19 form a box type structure or receptacle for containing manure and provides an aperture or gap 20 (Fig. 1) through which the manure is discharged.

A power input shaft 26 is universally connected to a telescoping shaft 27 which is adapted to be connected to a power take-off shaft of a tractor (not shown). Telescoping shaft 27 has incorporated therein a conventional overload clutch 28. Power input shaft 26 is suitably journaled in a plate member 29 attached to transversely extending angle irons 6 and 11. Attached to the rearward end of shaft 26 is an impeller member 31. The purpose of this impeller member is to prevent an accumulation of manure on the portion of tube member 4 located immediately beneath the impeller member. A sprocket 32 is attached adjacent the forward end of shaft 26 for rotation therewith. A pair of transversely spaced slinger shafts 33 (only one of which is shown) are journaled in bearing assemblies 34 (Fig. 3) carried by a plate 35 attached to plate 12 and tubes 13 and 14. Sprockets 36 (only one of which is shown) are attached to the forward ends of the slinger shafts 33. Attached to the rearward ends of shafts 33 are feeder slinger assemblies 37 and 38 (Fig. 2) including slinger support members 39 and 41, respectively, which are attached to shafts 33. Mounted on the periphery of each slinger support member are curved slinger blades 42 with the blades on each support member being positioned diametrically opposed and with each blade curving toward the direction of rotation. Also mounted on each slinger support member are shredder spikes 43. Similar spikes 44 are attached to each blade.

Attached to the rearward end of slinger supports 39 and 41 are first and second rotary feeding members in the form of cones 46 and 47, respectively. Referring to Figs. 1 and 3, the line A—A which extends horizontally in the longitudinal direction of the machine through the apex of the cone 46 represents the axis of symmetry of the cone 46. The cone 47 is similarly symmetrical about a longitudinal axis which extends parallel to the axis A—A and passes through the apex of cone 47 as indicated at B in Fig. 2. As shown in Fig. 3, axis A—A is radially spaced or offset from the axis C—C on which the supporting shaft 33 for the cone 46 rotates. The same offset relation exists between the cone 47 and its associated supporting shaft 33. In actual construction, the cone 46 is eccentrically and nonrotatably mounted on slinger support 39 by means of cap screws 40 (Fig. 3) so that application of driving power to the shaft 33 which mounts the slinger support 39 will cause rotation of the cone 46 in unison with the slinger support 39 on the axis of said shaft while, at the same time, the axis of cone 46 moves in a circle about the axis of the associated shaft 33. The cone 47 is similarly secured to the slinger support 41 and, accordingly, when driving power is applied to the other shaft 33, the cone 47 and slinger support 41 will rotate as a unit on the axis of the other shaft 33 while the axis of the cone 47 describes a circle about the axis of said other shaft.

By suitable drive means which will be described later the slinger support members 39 and 41 are rotated simultaneously in opposite directions on their respective axes, that is, on the axes of the shafts 33, as indicated by arrows D and E in Fig. 2.

Attached to the feeder cone 46 as by welding is a screw like or raised spiral rib 48 which starts at the apex of the cone and unwinds helically forward about the periphery of the cone toward the base of the latter. The cone 47 is similarly equipped with a screw like or raised spiral rib 50, but it will be noted that the twist of the rib 50 is opposite hand to the twist of the rib 48. That is, the rib 48, as viewed in Fig. 2, is coiled in a right hand direction which is opposite to the direction in which the associated cone 46 rotates in operation as indicated by arrow D, and the rib 50 is coiled in a left hand direction as viewed in Fig. 2, which is opposite to the direction in which the associated cone 47 rotates in operation as indicated by arrow E. The purpose of the feeder cones and ribs is to aid in conveying manure from the adjacent end of conveyer 24 over the gap or aperture 20 (Fig. 2) to the slinger blades 42 for vertical downward distribution thereby. The eccentrically mounted conical feeders are particularly adapted for this purpose in that the cones during each revolution thereof move toward the side walls 19 and floor section 23 and during each revolution thereof also move toward each other thereby affording the ribs 48 and 50 a better opportunity to grip the manure and to move it forwardly to the slingers.

Attached to front end plate 12 (Fig. 1) in superposed relation to the path of the slinger blades is a slinger shield 51. Extending upwardly from the rear edge of slinger shield 51 is a guide shield 52 which is attached at the sides thereof to plates 18. At the upper edge of the guide shield, a floating shield 53 is pivotally mounted between plates 18. The slinger shield prevents an upward distribution of manure which might prove irritating to the tractor operator (not shown) if a strong tail wind happened to be blowing.

A shaft 54 is journaled in a gear box 56 attached to transversely extending angle iron 16 and vertically extending angle member 9. A sprocket 57 is mounted on shaft 54 and by means of a combination overload and throw out clutch 58, sprocket 57 may be engaged with shaft 54 to drive same. Clutch 58 is of conventional design and includes an overload jaw clutch (not shown) and a manually operated pin clutch (not shown) which pin clutch may be engaged or disengaged by means of a hand lever 59. The rear end of shaft 54 is gear connected within gear box 56 for driving a sprocket 61 which is chain connected to sprocket 62 attached to a beater shaft 63 journaled in side plates 18. Beater elements 64 are attached to beater shaft 63 and function as beating and conveying members for material contacted thereby. It should be noted that the direction of rotation of the beater shaft 63 as indicated by arrow F in Fig. 1 is such that manure contacted by elements 64 is lifted over shaft 63 and onto the rear ends of the feeders adjacent the slinger blades, thus helping to prevent an overloading of the feeders.

Variable speed reduction means (not shown) are operatively interposed between the beater shaft 63 and shaft 25 of the floor conveyer for driving the latter. This speed reduction means can be similar to that disclosed in the hereinbefore mentioned Scranton patent. A chain 66 drivingly engages sprockets 36 (only one of which is shown) and sprocket 57 with drive sprocket 32 in conventional manner as disclosed, for instance, in the hereinbefore mentioned Scranton Patent U.S. 2,660,439. The power transmitting mechanism including the sprockets 36, 57, 32 and chain 66 is so arranged that application of driving power to the shaft 27 will cause synchronous rotation of the support members 39 and 41 in opposite directions, and the phase relation between the support members 39 and 41 is such that the conical members 46 and 47 will be laterally displaced alternately toward and away from each other by orbital movement of said conical members about the axes C—C of the support members 46 and 47, respectively.

The operation of spreader 3 is as follows: Conveyer 24 moves manure forwardly toward feeding cones 46 and 47. Before the material reaches the discharge end of conveyer 24 it is contacted by the counter rotating eccentric feeder cones 46, 48 and 47, 50 which coacting with each other, and the side walls 19 or floor section 23 (depending on the phase of their rotation cycle the cones happen to be in) draw the material forwardly into contact with the shredding fingers 43 and 44 and the slinger blades 42. The upper portion of the material moved forwardly by the floor conveyer is contacted by beater members 64 which shred and lift the material thereover and onto the feeder cones adjacent the slinger blades. As the feeder cones 46 and 47 are eccentrically mounted their action provides a great deal of agitation and aggressiveness in moving trashy manure, such as stable or barnyard refuse, to the slingers and as this aggressiveness is only periodic, it does not result in an undue packing of the material but does provide efficient feeding with a minimum of power. The slinger assemblies revolve in opposite directions so that their adjoining surfaces are moving upwardly. The blades are prevented from slinging material upwardly by the shields. The manure is downwardly and outwardly distributed through aperture 20 by the slinger blades during the downward movement thereof.

In the embodiment here shown and described for purposes of illustration all the mechanisms including the slingers and feeders, the impeller, the floor conveyer, and the beater are power take-off operated and the spreader is of the front delivery type. It should be understood that the slinger feeder means herein disclosed is capable of being used advantageously irrespective of whether the spreader is power operated or not and whether it is front or rear spreading and, therefore, it is not desired to limit the invention to the exact construction and arrangement of parts herein disclosed as various modifications within the scope of the appended claims may occur to persons skilled in the art.

It is claimed and desired to secure by Letters Patent:

1. A manure spreader comprising in combination, a box type body structure having an aperture for the discharge of material therefrom, a floor conveyer operatively associated with said body structure for advancing material therein toward said aperture, a material slinging device having a pair of transversely spaced support members rotatably mounted adjacent said aperture in opposed material receiving relation to the discharge end of said conveyer, and a pair of conical rotary feeding members eccentrically and nonrotatably mounted, respectively, on said support members adjacent said aperture with the apex ends of said conical members positioned in spaced overlying relation to said discharge end of said conveyer, and drive means operatively associated with said support members for rotating the latter synchronously in opposite directions and in such phase relation to each other as to cause alternate lateral displacement of said conical members toward and away from each other by orbital movement thereof about the axes of rotation, respectively, of said support members.

2. A manure spreader comprising in combination, a box type body structure having an aperture for the discharge of material therefrom, a floor conveyer operatively associated with said body structure for advancing material therein toward said aperture, a material slinging device having a pair of transversely spaced support members mounted adjacent said aperture in opposed material receiving relation to the discharge end of said conveyer for rotation about parallel longitudinal axes of rotation extending in the general direction of material movement and a pair of conical feeding members eccentrically and nonrotatably mounted on said support members, respectively, adjacent said aperture with the apex ends of said conical members positioned in spaced overlying relation to said discharge end of said conveyer said conical members having longitudinal axes of symmetry, respectively, in spaced parallel relation to said axes of said support members, and each of said conical members being provided with a raised spiral rib portion extending from the apex to the base thereof; and drive means operatively associated with said support members for rotating the latter synchronously in opposite directions and in such phase relation to each other as to cause alternate lateral displacement of said conical members toward and away from each other by orbital movement thereof about said axes of said support members; said spiral rib portions being coiled about said conical members in such directions as to feed material to said slinging device upon rotation of said conical members in said opposite directions.

3. A manure spreader comprising in combination, a box type body structure having an aperture for the discharge of material therefrom, a floor conveyer operatively associated with said body structure for advancing material longitudinally thereof toward said aperture, a material slinging device having a pair of vertical slinger support members rotatably mounted on transversely spaced longitudinal axes adjacent said aperture in opposed material receiving relation to the discharge end of said conveyer, a first rotary conical feeding member eccentrically and nonrotatably mounted on one of said support members adjacent said aperture so as to present the apex end of said first feeding member in spaced overlying relation to said discharge end of said conveyer, a second conical rotary feeding member operatively mounted on the other of said support members laterally of said first feeding member so as to present the apex end of said second feeding member in spaced overlying relation to the discharge end of said conveyer, each of said feeding members being provided with a raised spiral rib portion extending from the apex to the base thereof; and drive means operatively associated with said support members for rotating the latter simultaneously in opposite directions on their respective axes.

4. A manure spreader comprising in combination, a box type body structure having an aperture for the discharge of material therefrom, a floor conveyer operatively associated with said body structure for advancing material longitudinally thereof toward said aperture, a material slinging device having a pair of vertical slinger support members rotatably mounted on transversely spaced longitudinal axes adjacent said aperture in opposed material receiving relation to the discharge end of said conveyer, and a pair of rotary conical feeding members eccentrically and nonrotatably mounted on said support members, respectively, adjacent said aperture with the apexes of said feeding members positioned in spaced overlying relation to said discharge end of said conveyer, each of said feeding members being provided with a raised spiral rib portion extending from the apex to the base thereof; and drive means operatively associated with said support members for rotating the latter simultaneously in opposite directions on their respective axes.

References Cited in the file of this patent
UNITED STATES PATENTS

| | | |
|---|---|---|
| 1,215,615 | Brown | Feb. 13, 1917 |
| 1,934,899 | White | Nov. 14, 1933 |
| 2,626,809 | Fergason | Jan. 27, 1953 |
| 2,660,439 | Scranton | Nov. 24, 1953 |